United States Patent [19]

Fox et al.

[11] 4,191,271

[45] Mar. 4, 1980

[54] GEARSHIFT LINKAGES FOR TILT-CAR VEHICLES

[75] Inventors: Stephen N. W. Fox, Luton; Edward H. Snook, Newport Pagnall, both of England; Norman F. Stimson, deceased, late of Luton, England, by Verity S. Stimson, personal representative

[73] Assignee: General Motors Corporation, Detroit, Mich.

[21] Appl. No.: 948,571

[22] Filed: Oct. 4, 1978

[30] Foreign Application Priority Data

Oct. 6, 1977 [GB] United Kingdom ............... 41623/77

[51] Int. Cl.² ..................... B60K 20/04; G05G 9/12
[52] U.S. Cl. .......................... 180/77 TC; 74/473 R; 180/89.14
[58] Field of Search ............. 180/77 TC, 89.14, 89.15; 74/473 R, 473 P, 475

[56] References Cited

U.S. PATENT DOCUMENTS 3,926,068  12/1975  Jantzen et al. ................ 180/89.14

FOREIGN PATENT DOCUMENTS 2600065  10/1976  Fed. Rep. of Germany ........ 180/89.14
2270115  12/1975  France ............................. 180/89.14
1372492  10/1974  United Kingdom .

Primary Examiner—Joseph F. Peters, Jr.
Assistant Examiner—Donn McGiehan
Attorney, Agent, or Firm—D. F. Scherer

[57] ABSTRACT

A gearshift linkage for transmitting movement of a gear lever mounted in the cab of a tilt-cab vehicle to a ratio-change transmission carried by a chassis portion of the vehicle. A U-secion yoke is pivotally connected to a lower extension of the gear lever. The U-section yoke is provided with an L-shaped locating projection, and is fixed to an inner tube member. An outer tube member providing a connection to the ratio-change transmission telescopically surrounds the inner tube member and is fixed at one end to a channel-section housing member provided with a spring-loaded latching pawl. In a normal operating position the U-section yoke and the channel-section housing member are locked together with the pawl engaging the yoke and the locating projection fitting snugly between side walls of the channel-section member. A detent plate on the lower lever extension unlatches the pawl when the cab tilts, to allow telescopic extension of the tube members.

5 Claims, 7 Drawing Figures

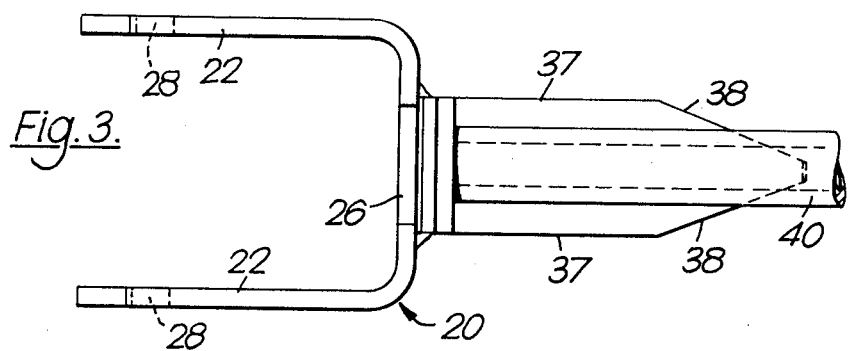
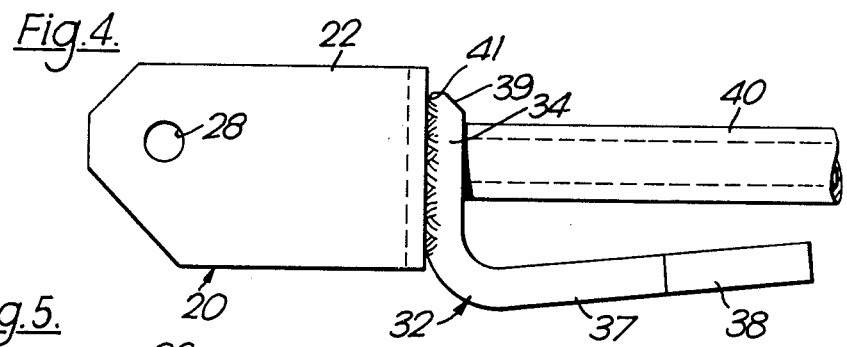
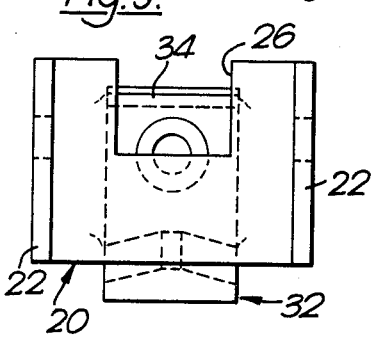
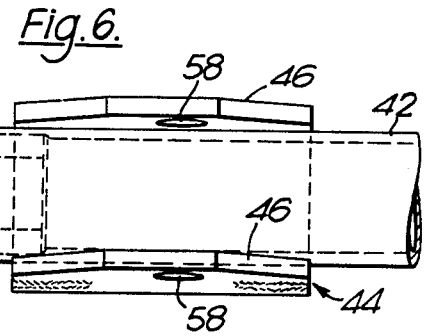
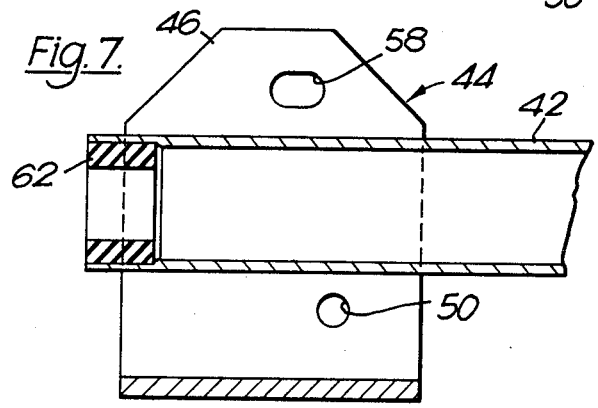

GEARSHIFT LINKAGES FOR TILT-CAR VEHICLES

This invention relates to gearshift linkages for tilt-cab vehicles.

In commercial vehicles having a driver's cab which is tiltable to allow access to an engine and ratio-change transmission that are carried by a chassis portion of the vehicle, the gear level for controlling the transmission is usually mounted in the cab, such that tilting of the cab produces relative movement between the gear lever and the transmission.

One method of accommodating such relative movement involves the use of a gearshift linkage including telescopic inner and outer tubular members, in conjunction with some form of selective latching arrangement for the telescopic parts.

Thus in U.K. patent specification No. 1,372,492, and the corresponding published German patent application DOS 2,203,606, a gearshift linkage for a tilt-cab vehicle is disclosed which utilises telescopic inner and outer tubes, the inner tube being connected to a yoke which has a pivotal connection to the lower end of the gear lever, and forms a mounting for one part of a selective latching arrangement, and includes a locating member, and the outer tube, which provides a connection to the ratio-change transmission, being connected to a support member for another part of the selective latching arrangement, and for a spring providing spring-loading for this part, the support member including a locating member for co-operation with the locating member on the yoke, and the gear lever having at its lower end portion a detent portion for effecting unlatching, to permit telescopic extension of the inner and outer tubes, in response to tilting of the cab of the vehicle.

This prior gearshift linkage utilises an internally acting selective latching arrangement, inasmuch as tilting of the cab of the vehicle results in an internal plunger being pushed against a spring bias to cause a ring of balls to move in a radially outward direction from a locking position into an inactive position permitting telescopic extension of the inner and outer tubes of the linkage.

An alternative construction, disclosed in U.K. patent specification No. 1,461,357, is functionally similar to the prior gearshift linkage, except that the latching is achieved by the use of a locking pawl which is pivotally mounted on the yoke connected to the inner tube, the pawl being biased by a spring-loaded plunger, or alternatively by a torsion spring.

The present invention is concerned with a gearshift linkage for tilt-cab vehicles permitting a simple and robust design which is capable of giving reliable operation.

In a gearshift linkage in accordance with the present invention, for transmitting movement of a gear lever mounted in the cab of a tilt-cab vehicle to a ratio-change transmission carried by a chassis portion of the vehicle, the gear lever is pivotally mounted in a spherical bearing and includes a lower lever portion, a U-section yoke comprising a pair of spaced side members interconnected by a transverse member is pivotally connected by way of the side members thereof to the lower gear lever portion, a locating projection extends from the transverse member in the opposite direction to the side members, an elongate inner tube member has one end connected to the transverse member and extends therefrom in the opposite direction to the side members, the inner tube member is telescopically received within an elongate outer tube member providing a connection to linkage for actuating the ratio-change transmission, a channel-section housing member is secured by way of side walls thereof to an end region of the outer tube and the side walls include facing surfaces arranged for co-operation with the locating member, a latching pawl is pivotally mounted on the housing member between the side walls thereof and is spring-biased towards a position for providing latching engagement with the transverse member, and a detent member at the lower end region of the lower level portion of the gear lever is arranged, during tilting movement of the cab of the vehicle from its normal operational position, in which the pawl is in its position of latching engagement with the transverse member, to engage a cam surface of the pawl to cause the pawl to pivot to an unlatched position permitting telescopic extension of the inner and outer tube members, subsequent return movement of the cab of the vehicle to its normal operational position causing telescopic shortening of the inner and outer tube members until the locating projection co-operates with the facing surfaces of the side walls of the housing member and the pawl again assumes its position of latching engagement with the transverse member.

The latching pawl is conveniently spring-biased towards its position of latching engagement with the transverse member by arm portions of a twin-coil torsion spring which is mounted around a pivot bolt for the pawl.

The pivot bolt for the latching pawl may be mounted in holes in the side walls of the housing member which are elongate along axes parallel to the longitudinal axis of the telescopic tubular members, to permit adjustment of the position of the pivot axis of the latching pawl.

The transverse member may comprise two plate-like parts welded or otherwise secured together, one of these parts comprising a base portion of the U-section yoke and the other part comprising a base portion of the locating projection. With such a construction, the base portion of the yoke may be recessed to permit the latching pawl to make latching engagement with the base portion of the locating projection.

The locating projection may be laterally tapered, and the facing surfaces of the side walls of the housing member may be provided with respective stops made of rubber or other elastomeric material for engagement by the tapering lateral surfaces of the locating projection to provide a snubbing action as the latching pawl is assuming its position of latching engagement with the transverse member.

Figure 2:
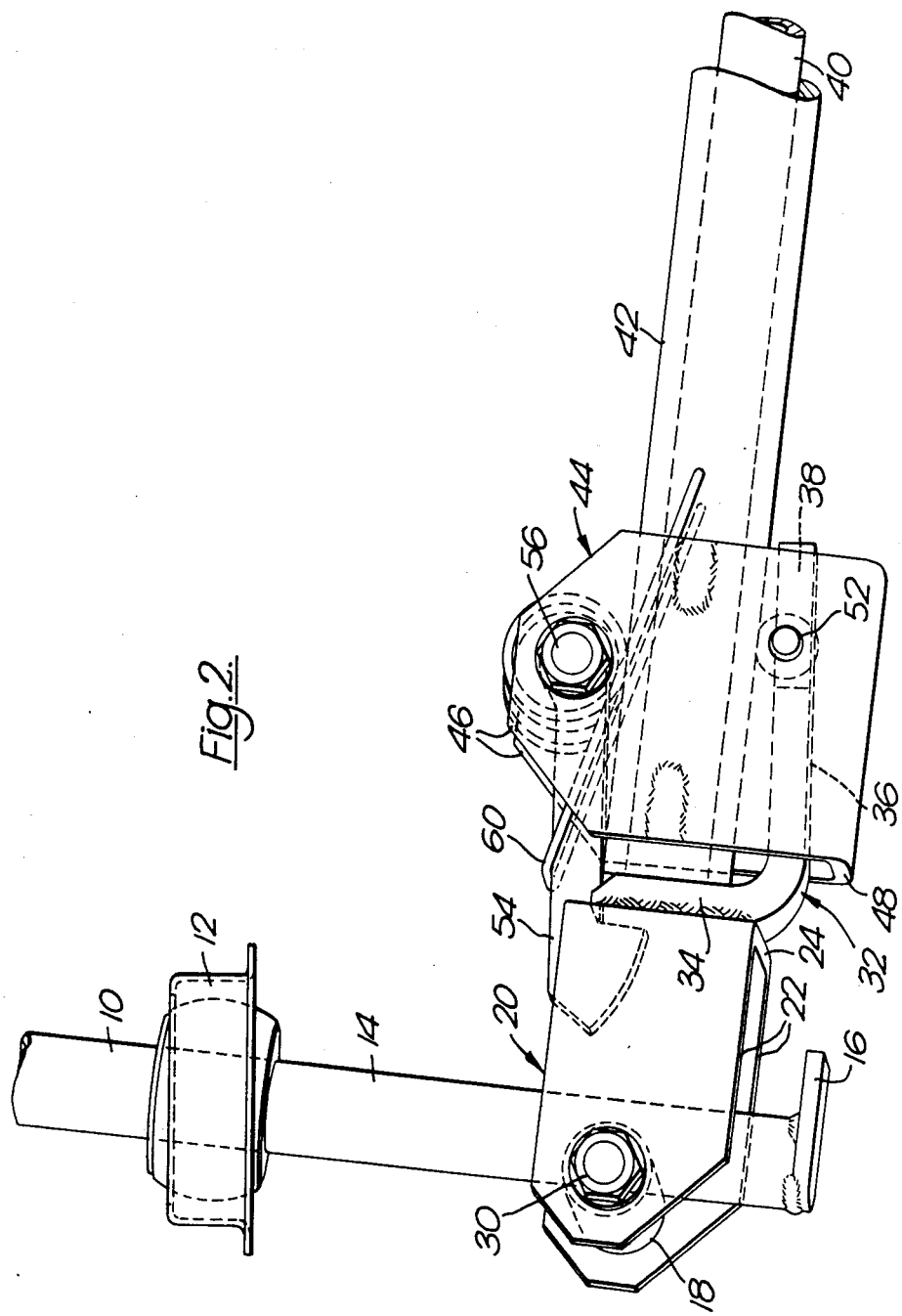
FIG. 2 is an enlarged fragmentary elevation of the gearshift linkage shown in FIG. 1, but with the parts shown in a normal latched position.

FIGS. 3 to 5 are respectively a fragmentary plan, a fragmentary elevation, and an end view, showing a U-section yoke and associated locating projection forming part of the gearshift linkage shown in FIG. 2; and FIGS. 6 and 7 are respectively a fragmentary plan and a fragmentary elevation showing a channel-section housing member forming a mounting for a locking pawl of the gearshift linkage shown in FIG. 2.

As is shown in the drawings, in particular in FIGS. 1 and 2, a conventional gearshift lever (gear lever) 10 is pivotally mounted in a spherical pivot bearing 12 supported by a floor portion of the cab of a tilt-cab vehicle, and the gearshift lever includes a lower lever portion 14 which projects below the floor of the cab, a rearwardly projecting detent plate 16 being welded to the lowermost end of the lower lever portion.

The lower lever portion 14 is recessed to accommodate a short transversely extending tube 18, the tube being secured by fillet welds to the lower lever portion and being fitted with an internal bearing bush (not shown).

A U-section yoke 20 comprises a pair of spaced parallel side members 22 interconnected by a plate-like base portion 24, the upper portion of which is formed with a rectangular recess 26 as shown in FIG. 5. The side members 22 are formed with aligned holes 28 to accommodate a pivot bolt 30 which is received within the bearing bush in the tube 18 for pivotally connecting the yoke 20 to the lower lever portion 14.

An L-shaped locating projection 32 comprises a base portion 34 which is secured by fillet welds to the base portion 24 of the yoke 20, to form a composite transverse member, and an elongate portion 36 which extends from the transverse member in the opposite direction to the side members 22, and, as is best seen in FIGS. 3 and 4, is formed with parallel edge surfaces 37 and terminal tapering lead-in ramp edges 38. The free end of the base portion 34 has chamfered edges 39 and 41, shown in FIG. 4.

As is also best seen in FIGS. 3 and 4, an elongate inner tube member 40 has one end fixedly connected by welds to the transverse member, and extends from the transverse member in the opposite direction to the side members 22. This inner tube member 40 is telescopically received within an elongate outer tube member 42 that is pivotally connected to a relay lever pivotally mounted on the engine or its flywheel housing, whereby the outer tube member 42 provides a connection to linkage for operating a conventional ratio-change transmission constituted by a gearbox (not shown) mounted on the chassis portion of the vehicle and/or secured directly or indirectly to the engine or its flywheel housing.

A channel-section housing member 44 comprising spaced parallel side walls 46 interconnected by a base portion 48 is secured by way of its side walls by means of slot welds to the end portion of the outer tube member 42 adjacent the U-section yoke 20. The side walls 46 include machined flat facing surfaces, for co-operating with the edge surfaces 37 of the locating projection 32. Holes 50 are formed in the parts of the side walls 46 provided with the machined surfaces, and accommodate mushroom-headed rubber stops 52 for snubbing engagement with the tapering lateral surfaces constituted by the ramp edges 38 of the locating projection 32.

A latching pawl 54 is pivotally mounted on the channel-section housing member 44 by means of a pivot bolt 56 that is mounted in aligned holes 58 in the side walls 46, these holes 58 being elongate along axes parallel to the longitudinal axis of the telescopic tubuler members, to permit adjustment of the position of the pivot axis of the latching pawl. A double-coil torsion spring 60 comprises a pair of spring coils mounted around the pivot bolt 56, a pair of free end portions providing reaction at the channel-section housing member 44 and outer tube member 42, and an intermediate connecting portion engaging the latching pawl 54 to provide a resilient bias in the latching direction.

A bushing 62 (FIG. 7), within the end portion of the outer tube member 42 in the region of the housing member 44 forms a sliding bearing on the inner tube member 40 for relative telescopic movement of the inner and outer tube members, and a second bushing (not shown) is mounted on the inner tube member at its opposite end, that is, the end nearer the relay lever.

The gearshift linkage is illustrated in FIG. 2 in its telescopically collapsed, normal operating condition with the outer tube 42 in abutment with one face of the base portion 34 and the latching pawl in spring-biased engagement with the free end and the other face of the base portion 34, and the locating projection 32 snugly engaged between the side walls 46, thereby locking together the yoke 20 and housing member 44 to allow side-to-side ratio-section movement, and fore-and-aft ratio-engagement movement, of the gearshift lever to be transmitted by way of the telescopic tube members and the relay lever for operation of the ratio-change transmission.

When tilting of the cab is required, as by actuation of hydraulic jacks (not shown) provided for this purpose, the changing position of the cab as it tilts relative to the chassis portion of the vehicle causes the gearshift lever to pivot generally about the pivot bolt 30 until the detent plate 16 engages the latching pawl 54 and moves the pawl against the bias of its spring 60 to an unlatched position clear of the base portion 34, such that further tilting of the cab is accompanied by telescopic lengthening of the assembly constituted by the inner and outer tube members 40 and 42.

Figure 1:
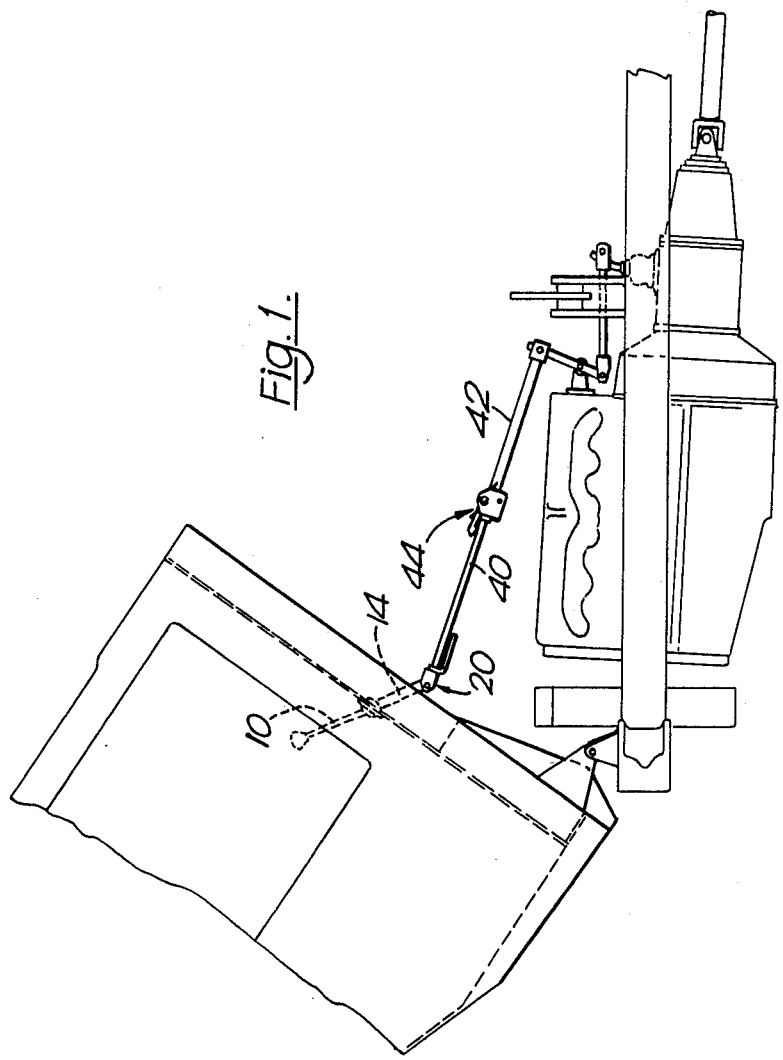
FIG. 1 is a fragmentary general elevation illustrating somewhat schematically a preferred embodiment of a gearshift linkage in accordance with the present invention for transmitting movement of a gear lever mounted in the cab of a tilt-cab vehicle to a ratio-change transmission carried by a chassis portion of the vehicle, with the cab shown in a tilted position.

On return of the cab to its normal operating position, the outer tube member 42 telescopes over the inner tube member 40 until, sequentially, the channel-section housing member 44 co-operates with the locating projection 32 to give a locating action, the latching pawl 54 is cammed upwardly by the chamfered edge 39 of the base portion 34, and the stops 52 and the tapering lead-in ramp edges 38 of the locating projection engage with a snubbing action allowing the pawl 54 to move smoothly under the action of its biasing spring 60 into the latched condition shown in FIG. 1, in which the telescopic linkage is effectively locked solid to provide for normal operation of the ratio-change transmission.

We claim:

1. A gearshift linkage for transmitting movement of a gear lever mounted in the cab of a tilt-cab vehicle to a ratio-change transmission carried by a chassis portion of the vehicle, comprising a gear lever which is pivotally mounted intermediate its ends in a spherical bearing and includes a lower lever portion, a U-section yoke comprising a pair of spaced side members interconnected by a transverse member, means pivotally connecting the yoke by way of the side members thereof to the lower portion of the gear lever, a locating projection extending from the transverse member in the opposite direction to the side members, an elongate inner tube member connected at one end thereof to the transverse member and extending therefrom in the opposite direction to the side members, an elongate outer tube member telescopically accommodating the inner tube member and providing a connection to linkage for actuating the ratio-change transmission, a channel-section housing member secured by way of side walls thereof to an end region of the outer tube member, facing surfaces of the side walls of the channel-section housing member arranged for co-operation with the locating projection, a latching pawl pivotally mounted on the housing member between the side walls thereof, means spring-biasing the latching pawl towards a portion for providing latching engagement with the transverse member, and a detent member projecting from the lower end region of the lower lever portion of the gear lever and arranged, during tilting movement of the cab of the vehicle from its normal operational position, in which the pawl is in its position of latching engagement with the transverse member, to engage a cam surface of the pawl to cause the pawl to pivot to an unlatched position permitting telescopic extension of the inner and outer tube members, subsequent return movement of the cab of the vehicle to its normal operational position causing telescopic shortening of the inner and outer tube members until the locating projection co-operates with the facing surfaces of the side walls of the housing member and the pawl again assumes its position of latching engagement with the transverse member.

2. A gearshift linkage for transmitting movement of a gear lever mounted in the cab of a tilt-cab vehicle to a ratio-change transmission carried by a chassis portion of the vehicle, comprising a gear lever which is pivotally mounted intermediate its ends in a spherical bearing and includes a lower lever portion, a U-section yoke comprising a pair of spaced side members interconnected by a transverse member, means pivotally connecting the yoke by way of the side members thereof to the lower portion of the gear lever, a locating projection extending from the transverse member in the opposite direction to the side members, an elongate inner tube member connected at one end thereof to the transverse member and extending therefrom in the opposite direction to the side members, an elongate outer tube member telescopically accommodating the inner tube member, means connecting the outer tube member to linkage for actuating the ratio-change transmission, a channel-section housing member secured by way of side walls thereof to an end region of the outer tube member, facing surfaces of the side walls of the channel-section housing member arranged for co-operation with the locating projection, a latching pawl pivotally mounted by means of a pivot bolt on the housing member between the side walls thereof, a twin-coil torsion spring which is mounted around the pivot bolt and is effective to spring-bias the pawl towards a position for providing latching engagement with the transverse member, and a detent member projecting from the lower end region of the lower lever portion of the gear lever and arranged, during tilting movement of the cab of the vehicle from its normal operational position, in which the pawl is in its position of latching engagement with the transverse member, to engage a cam surface of the pawl to cause the pawl to pivot to an unlatched position permitting telescopic extension of the inner and outer tube members, subsequent return movement of the cab of the vehicle to its normal operational position causing telescopic shortening of the inner and outer tube members until the locating projection co-operates with the facing surfaces of the side walls of the housing member and the pawl again assumes its position of latching engagement with the tranverse member.

3. A gearshift linkage for transmitting movement of a gear lever mounted in the cab of a tilt-cab vehicle to a ratio-change transmission carried by a chassis portion of the vehicle, comprising a gear lever which is pivotally mounted intermediate its ends in a spherical bearing and includes a lower lever portion, a U-section yoke comprising a pair of spaced side members interconnected by a transverse member, means pivotally connecting the yoke by way of the side members thereof to the lower portion of the gear lever, a locating projection extending from the transverse member in the opposite direction to the side members, an elongate inner tube member connected at one end thereof to the transverse member and extending therefrom in the opposite direction to the side members, an elongate outer tube member telescopically accommodating the inner tube member, means connecting the outer tube member for actuating the ratio-change transmission, a channel-section housing member secured by way of side walls thereof to an end region of the outer tube member, facing surfaces of the side walls of the channel-section housing member arranged for co-operation with the locating projection, a pivot bolt mounted in holes of the side walls of the housing member which are elongate along axes parallel to the longitudinal axis of the telescopic tubular members, a latching pawl pivotally mounted by means of the pivot bolt on the housing member between the side walls thereof, a torsion spring mounted around the pivot bolt and effective to bias the latching pawl towards a position for providing latching engagement with the transverse member, and a projecting detent member mounted at the lower end of the lower lever portion of the gear lever and arranged, during tilting movement of the cab of the vehicle from its normal operational position, in which the pawl is in its position of latching engagement with the transverse member, to engage a cam surface of the pawl to cause the pawl to pivot to an unlatched position permitting telescopic extension of the inner and outer tube members, subsequent return movement of the cab of the vehicle to its normal operational position causing telescopic shortening of the inner and outer tube members until the locating projection co-operates with the facing surfaces of the side walls of the housing member and the pawl again assumes its position of latching engagement with the transverse member.

4. A gearshift linkage for transmitting movement of a gear lever mounted in the cab of a tilt-cab vehicle to a ratio-change transmission carried by a chassis portion of the vehicle, comprising a gear lever which is pivotally mounted intermediate its ends in a spherical bearing and includes a lower lever portion, a U-section yoke comprising a pair of spaced side members interconnected by a plate-like transverse base portion, means pivotally connecting the yoke by way of the side members thereof to the lower gear lever portion, L-shaped locating means comprising a plate-like base portion secured to the base portion of the yoke and a locating projection extending therefrom in the opposite direction to the side members of the yoke, an elongate inner tube member connected at one end thereof to the base portion of the locating means and extending therefrom in the opposite direction to the side members, an elongate outer tube member telescopically accommodating the inner tube member and providing a connection to linkage for actuating the ratio-change transmission, a channel-section housing member secured by way of side walls thereof to an end region of the outer tube member, facing surfaces of the side walls of the channel-section housing member arranged for co-operation with the locating projection, a latching pawl pivotally mounted on the housing member between the side walls thereof, means spring-biasing the latching pawl towards a position for providing latching engagement with the base portion of the locating means, the base portion of the yoke being recessed to permit such engagement, and a detent member projecting from the lower end region of the lower lever portion of the gear lever and arranged, during tilting movement of the cab of the vehicle from its normal operational position, in which the pawl is in its position of latching engagement with the base portion of the locating means, to engage a cam surface of the pawl to cause the pawl to pivot to an unlatched position permitting telescopic extension of the inner and outer tube members, subsequent return movement of the cab of the vehicle to its normal operational position causing telescopic shortening of the inner and outer tube members until the locating projection co-operates with the facing surfaces of the side walls of the housing member and the pawl again assumes its position of latching engagement with the base portion of the locating means.

5. A gearshift linkage for transmitting movement of a gear lever mounted in the cab of a tilt-cab vehicle to a ratio-change transmission carried by a chassis portion of the vehicle, comprising a gear lever which is pivotally mounted intermediate its ends in a spherical bearing and includes a lower lever portion, a U-section yoke comprising a pair of spaced side members interconnected by a transverse member, means pivotally connecting the yoke by way of the side members thereof to the lower portion of the gear lever, a laterally tapered locating projection extending from the transverse member in the opposite direction to the side members, an elongate inner tube member connected at one end thereof to the transverse member and extending therefrom in the opposite direction to the side members, an elongate outer tube member telescopically accommodating the inner tube member and providing a connection to linkage for actuating the ratio-change transmission, a channel-section housing member secured by way of side walls thereof to an end region of the outer tube member, facing surfaces of the side walls of the channel-section housing member arranged for co-operation with the locating projection, a latching pawl pivotally mounted on the housing member between the side walls thereof, means spring-biasing the latching pawl towards a position for providing latching engagement with the transverse member, a pair of stops made of elastomeric material projecting from the facing surfaces of the side walls of the housing member for engagement by lateral surfaces of the locating projection to provide a snubbing action at the tapers as the latching pawl is assuming its position of latching engagement with the transverse member, and a detent member projecting from the lower end region of the lower lever portion of the gear lever and arranged, during tilting movement of the cab of the vehicle from its normal operational position, in which the pawl is in its position of latching engagement with the transverse member, to engage a cam surface of the pawl to cause the pawl to pivot to an unlatched position permitting telescopic extension of the inner and outer tube members, subsequent return movement of the cab of the vehicle to its normal operational position causing telescopic shortening of the inner and outer tube members until the lateral surfaces of the locating projection co-operate with the pair of stops and with the facing surfaces of the side walls of the housing member and the pawl again assumes its position of latching engagement with the transverse member.

* * * * *

UNITED STATES PATENT AND TRADEMARK OFFICE
CERTIFICATE OF CORRECTION

PATENT NO. : 4,191,271
DATED : March 4, 1980
INVENTOR(S) : Stephen N.W. Fox, Edward H. Snook, Norman F. Stimson It is certified that error appears in the above-identified patent and that said Letters Patent are hereby corrected as shown below:

Abstract page and column 1, title "Gearshift Linkages for Tilt-Car Vehicles" should read -- Gearshift Linkages for Tilt-Cab Vehicles --.

Column 1, line 10, "gear level" should read -- gear lever --.

Column 2, line 12, "lower level" should read -- lower lever --.

Signed and Sealed this

Second Day of September 1980

[SEAL]

Attest:

SIDNEY A. DIAMOND

Attesting Officer        Commissioner of Patents and Trademarks